(12) United States Patent
Li et al.

(10) Patent No.: US 12,109,484 B2
(45) Date of Patent: Oct. 8, 2024

(54) METHOD FOR CONTROLLING GAME CHARACTER

(71) Applicant: NetEase (Hangzhou) Network Co., Ltd., Zhejiang (CN)

(72) Inventors: Yan Li, Zhejiang (CN); Fei Xie, Zhejiang (CN); Zhangpeng Tang, Zhejiang (CN); Bin Li, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 359 days.

(21) Appl. No.: 17/498,599

(22) Filed: Oct. 11, 2021

(65) Prior Publication Data

US 2022/0023762 A1    Jan. 27, 2022

Related U.S. Application Data

(60) Division of application No. 15/919,683, filed on Mar. 13, 2018, now Pat. No. 11,185,764, which is a
(Continued)

(30) Foreign Application Priority Data

Sep. 14, 2015    (CN) .......................... 201510582713.8

(51) Int. Cl.
*A63F 13/2145*    (2014.01)
*A63F 13/214*    (2014.01)
(Continued)

(52) U.S. Cl.
CPC ........ *A63F 13/2145* (2014.09); *A63F 13/214* (2014.09); *A63F 13/426* (2014.09);
(Continued)

(58) Field of Classification Search
CPC .... A63F 13/2145; A63F 13/42; A63F 13/426; A63F 13/45; A63F 13/533;
(Continued)

(56) References Cited

U.S. PATENT DOCUMENTS 8,840,472 B2 *   9/2014   Toy .................. A63F 13/533
                                                           463/37
2002/0034979 A1   3/2002   Yamamoto et al.
(Continued)

FOREIGN PATENT DOCUMENTS

CN    101853100 A    10/2010
CN    102886140 A    1/2013
(Continued)

OTHER PUBLICATIONS

International Search Report (English and Chinese) and Written Opinion issued in PCT/CN/2016/097538 on Nov. 25, 2016, 10 pages.
(Continued)

*Primary Examiner* — Lawrence S Galka
(74) *Attorney, Agent, or Firm* — Qinghong Xu

(57)    ABSTRACT

A method for controlling a game character, comprising following steps: in response to a sliding operation started from an initial position of the skill button, locking the virtual joystick for disabling control of the skill release direction of the game character; monitoring a track of the sliding operation, obtaining a current position P2 of a touch point of the sliding operation, and calculating a vector a; determining whether the vector a meets the condition of |a|>a preset threshold L; if yes, generating a first operating instruction to release a skill in the direction of the vector a; and unlocking the virtual joystick; if no, determining whether the sliding operation has been released; if yes, generating a second operating instruction to release the skill, wherein a release
(Continued)

direction is a current orientation of the game character; and unlocking the virtual joystick. The method may effectively reduce a misoperation rate.

9 Claims, 3 Drawing Sheets

Related U.S. Application Data continuation of application No. PCT/CN2016/097538, filed on Aug. 31, 2016.

(51) Int. Cl.
| | | |
|---|---|---|
| *A63F 13/426* | (2014.01) | |
| *A63F 13/428* | (2014.01) | |
| *A63F 13/58* | (2014.01) | |
| *G06F 3/0484* | (2022.01) | |
| *G06F 3/0488* | (2022.01) | |
| *A63F 13/822* | (2014.01) | |
| *A63F 13/92* | (2014.01) | |

(52) U.S. Cl.
CPC ............ *A63F 13/428* (2014.09); *A63F 13/58* (2014.09); *A63F 13/822* (2014.09); *A63F 13/92* (2014.09)

(58) Field of Classification Search
CPC .... A63F 13/5372; A63F 13/58; A63F 13/798; A63F 13/822; A63F 13/92; A63F 2300/1075; G06F 3/038; G06F 3/0338; G06F 3/04883; G06F 3/04886
See application file for complete search history.

(56) References Cited

U.S. PATENT DOCUMENTS

| | | |
|---|---|---|
| 2007/0243931 A1 | 10/2007 | Ohta et al. |
| 2007/0262999 A1* | 11/2007 | Bridger .................. A63F 13/45 |
| | | 345/473 |
| 2008/0132333 A1 | 6/2008 | Kogo |
| 2008/0171595 A1 | 7/2008 | Nakasaka |
| 2014/0066195 A1 | 3/2014 | Matsui et al. |
| 2014/0100026 A1 | 4/2014 | Seo |
| 2016/0199728 A1* | 7/2016 | Yoon .................... G06F 3/0488 |
| | | 463/37 |

FOREIGN PATENT DOCUMENTS

| | | |
|---|---|---|
| CN | 104066488 A | 9/2014 |
| CN | 105194871 A | 12/2015 |

OTHER PUBLICATIONS

Office Action issued in CN201510582713.8 on Sep. 5, 2016, 5 pages.

* cited by examiner

METHOD FOR CONTROLLING GAME CHARACTER

CROSS REFERENCE TO RELATED APPLICATION

This application is a divisional application of Ser. No. 15/919,683, filed on Mar. 13, 2018.

TECHNICAL FIELD

The present application relates to a method for controlling a game character.

BACKGROUND

As mobile terminals are widely applied, there is an increasing requirement for developing games on the mobile terminals. Currently, games such as ARPG (Action Role Playing Game), TPS (Third Personal Shooting Game), and FPS (First-Personal Shooting Game) on mobile platform, when the players manipulates the game characters in a game battle, operations of directional movement and skills are always related each other. Usually, a direction of character is controlled by manipulating a virtual joystick, and a corresponding operation is generated by tapping a skill button. For example, on an interface of mobile game shown in FIG. 1, a player usually manipulates a virtual joystick and a skill button simultaneously by both of hands. Generally, operation steps are as follows: a. A finger of left-hand slides a virtual joystick 100 along a central point of the virtual joystick 100, to adjust an orientation of a character to a direction required for an operation (for example, when a monster attacks the character, the character would like to dodge in a direction opposite to the monster). b. A finger of right-hand taps a virtual button corresponding to the virtual skill in the game. For example, a skill button 200 is corresponded to a skill of A, and other skill buttons are corresponded to skills of B, C, and D respectively. In this way, the game character on the game interface performs an action (such as dodging, jumping, or attacking) in a corresponding direction. When some operations need to be performed in a direction, the left hand and the right hand need to cooperate to perform the operations simultaneously. Such operations have a disadvantage of poor continuity, leading to a high misoperation rate. For example, when the release direction of skill controlled by the left hand is not completely focused on a target direction, the finger of right-hand may tap a skill button ahead. If such misoperations are frequently occurred during the game, user experience of game will be greatly reduced.

SUMMARY

A technical problem to be resolved in the embodiments of the present application is: to compensate for advantages in the prior art, a method for controlling a game character is provided, so as to effectively reduce a misoperation rate and improve user experience.

The technical problem in the embodiments of the present application is resolved by using the following technical solutions:

A method for controlling a game character, used for controlling the game character by using a virtual control component, where the virtual control component comprises a skill button used for controlling skill release of the game character and a virtual joystick used for controlling movement of the game character and controlling a skill release direction of the game character, and the method comprises the following steps: (S1) in response to a sliding operation of a player started from an initial position of the skill button, locking the virtual joystick in a game for disabling control of the skill release direction of the game character; (S2) monitoring a track of the sliding operation of the player started from an initial position of the skill button, obtaining a current position P2 of a touch point of the sliding operation, and calculating a vector a from an initial tapping position P1 of the touch point to the current position P2 of the touch point; and (S3) in response to release of the sliding operation of the player, or in response to meet the condition of |a|>L, wherein L is a preset threshold, generating a first operating instruction for controlling the game character to release a skill corresponding to the skill button, wherein a release direction of the skill is the same as a direction of the vector a; and unlocking the virtual joystick.

A method for controlling a game character, used for controlling the game character by using a virtual control component, where the virtual control component comprises a skill button used for controlling skill release of the game character and a virtual joystick used for controlling movement of the game character and controlling a skill release direction of the game character, and the method comprises the following steps: (Q1) in response to a sliding operation of a player started from an initial position of the skill button, locking the virtual joystick in a game for disabling control of the skill release direction of the game character; (Q2) monitoring a track of the sliding operation of the player started from an initial position of the skill button, obtaining a current position P2 of a touch point of the sliding operation, and calculating a vector a from an initial tapping position P1 of the touch point to the current position P2 of the touch point; (Q3) determining whether the vector a meets the condition of |a|>L, wherein L is a preset threshold; if yes, generating a first operating instruction for controlling the game character to release a skill corresponding to the skill button, wherein a release direction is the same as a direction of the vector a; and unlocking the virtual joystick; if no, performing step (Q4); and (Q4) determining whether the sliding operation of the player has been released; if yes, generating a second operating instruction for controlling the game character to release the skill corresponding to the skill button, wherein a release direction is a current orientation of the game character; and unlocking the virtual joystick; if no, returning to the step (Q2).

Compared with the prior art, the embodiments of the present application has the following beneficial effects:

According to the method for controlling a game character in the embodiments of the present application, detecting a tapping and sliding operation of a player started from an initial position of the skill button, so as to monitor a sliding track of the operation; and after obtaining a vector between a current position of a touch point that has been slid and an initial tapping position of the touch point, a corresponding operating instruction is generated according to release of the skill button by the player or according to synthetic judgment by a vector length and conditions of skill release, and the operating instruction controls a skill release direction according to a direction of the vector, thereby controlling a game character to release a skill in a particular release direction. In this way, a game player may manipulate a game character to release a corresponding skill in a particular direction by tapping and sliding a skill button with a single hand, without cooperated operations of the left and right hands, thereby greatly reducing the operation complexity and effectively reducing a misoperation rate. The player may accurately manipulate skill release of the game character with a single hand, and the operation of game is more efficient and intuitive, thereby enhancing interesting of an operation in a game and greatly improving user experience.

BRIEF DESCRIPTION OF THE DRAWINGS

The present application will become more fully understood from the detailed description given herein below for illustration only, and thus are not limitative of the present application, and wherein.

DETAILED DESCRIPTION

The present application is described in further detail below with reference to embodiments and the accompanying drawings.

The idea of the present application is to set usage and implementation of a virtual buttons on a mobile terminal (mobile phone/tablet computer), so as to resolve a problem of a high misoperation rate when a player manipulates a game character to perform an operation in a direction. The operations on a game interface have been studied by the inventor. A virtual control component on the interface usually comprises: a skill button used for controlling skill release of the game character, and a virtual joystick used for controlling movement and skill release direction of the game character. However, in a game, a frequently used skill button such as a dodging skill button is required to be operated in cooperation with a direction. During each operation, two hands of the player have to perform operations separately, thereby greatly increasing the operation complexity of the player. In a tense game, operations cooperated by the two hands thereby increasing a misoperation rate. Usually, a skill such as dodge is an operation selected when the player is in a risk of being attacked. In this condition, the player is in a highly nervous mood, greatly increasing the difficulty of the two hands cooperated operation. In view of this, the inventor proposes that if an accurate operation could be implemented in one step, a misoperation rate will be greatly reduced in the game. Accordingly, it is suggested that the player can achieve both of a direction release operation and a skill release operation via a skill button with a single hand, and the adjustment of direction based on is further combined with the operation of the skill button. That is, a function of direction adjustment of the virtual joystick is integrated on a virtual skill button.

First Embodiment

Figure 1:
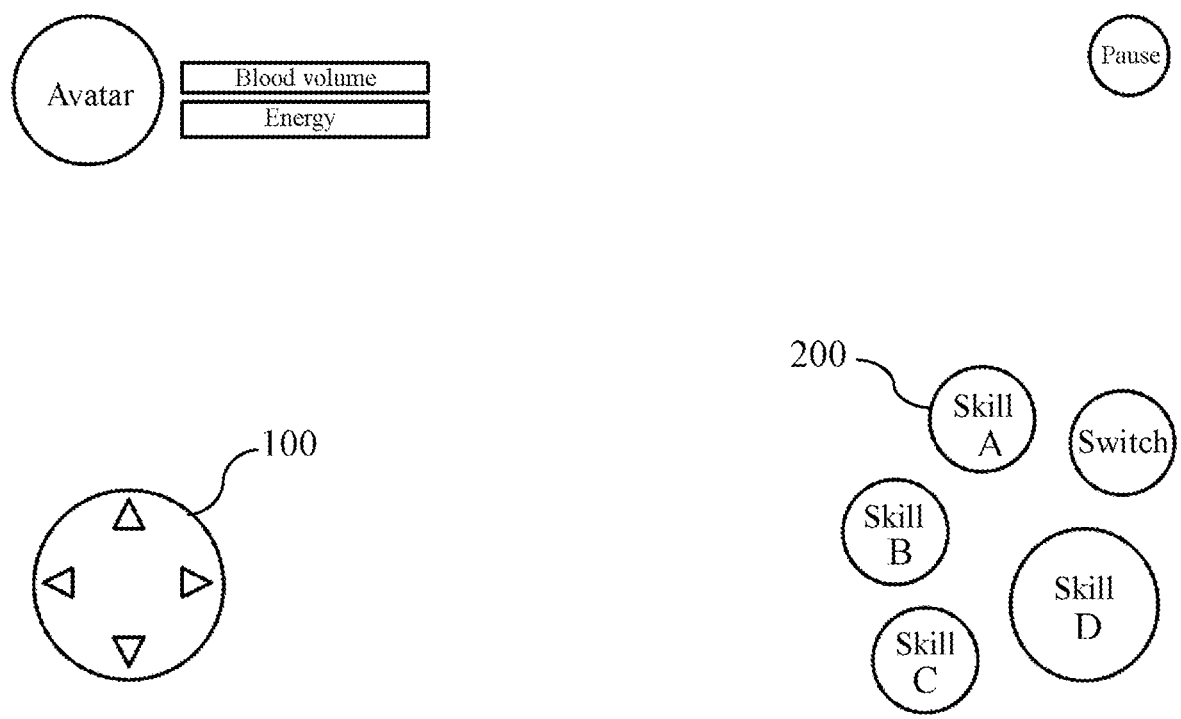
FIG. 1 is a schematic diagram of a status of a game interface in a mobile terminal.
Figure 2:
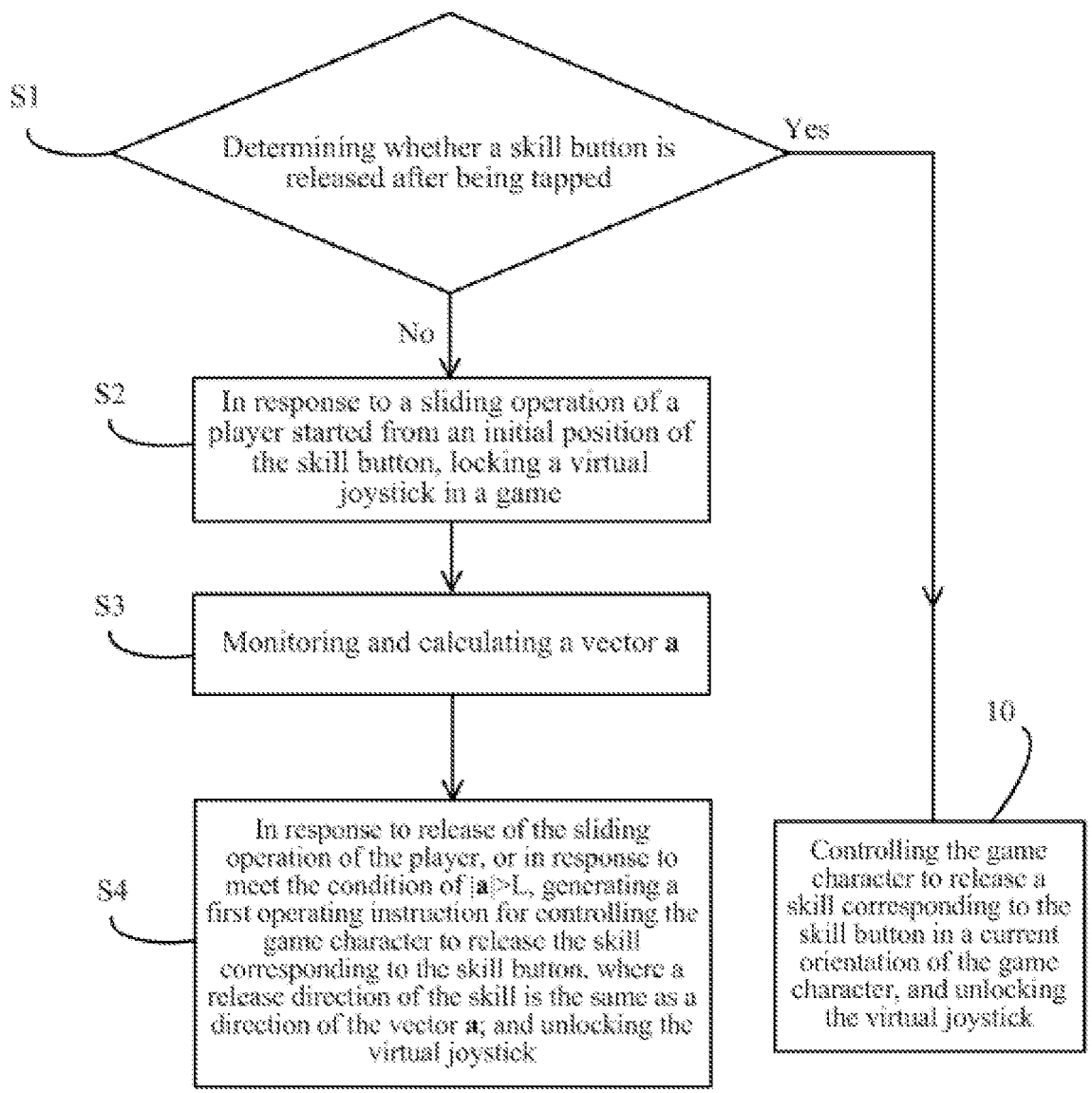
FIG. 2 is a flowchart of a method for controlling a game character according to a first embodiment of the present application.

As shown in FIG. 2, FIG. 2 shows a method for controlling a game character in this embodiment. A game character is shown in a game on a mobile terminal. The mobile terminal may be a mobile phone, a handheld game console, or a tablet computer. According to the method, the game character is controlled via a virtual control component. The virtual control component comprises a skill button used for controlling skill release of the game character and a virtual joystick used for controlling movement and a skill release direction of the game character. The skill button is any one of skill buttons that require to be used in combination with direction control, for example, a dodging skill button, a jumping skill button, a moving skill button, or an attacking skill button. The control method comprises the following steps:

(S1) Determining whether the skill button is released after being tapped; if yes, (10) controlling the game character to release a skill corresponding to the skill button in a current orientation of the game character, and unlocking the virtual joystick; if no, performing step (S2).

If the player only performs a tapping operation on the skill button, without a tendency of performing a sliding operation, the skill button is set to have a function as same as that of an ordinary button, and the skill button is tapped to directly complete an operation. An operation release direction is the current orientation of the game character, and the current orientation of the game character is obtained by controlling the virtual joystick. This step is set to retain an original function of the skill button, so that when the skill button is just in a tapped state, the skill button can still cooperate with the virtual joystick to implement an operation. Therefore, this step can be omitted in some implementations, and a process of controlling the game character is directly performed in a tapped and slide state of the skill button. Two manners of the operation can be provided by setting this step and cooperating with the following steps, comprising: controlling skill release and a release direction via the button and the joystick combined together, and only controlling skill release and a release direction via the button and locking the joystick during period of controlling, so as to satisfy requirements of different players and achieve a wider application.

(S2) In response to a sliding operation of the player started from an initial position of the skill button, locking the virtual joystick in a game for disabling control of the skill release direction of the game character.

When the player performs an operation, a finger of the player does not leave the skill button after tapping the skill button, and the sliding operation is performed on a screen by using the position of the skill button as the start point. In response to the tapping and sliding operations, the virtual joystick is controlled to be in a locked state. In this case, the virtual joystick cannot be used to control the direction, so as to avoid a conflict in a moving direction of the skill button.

(S3) Monitoring a track of the sliding operation of the player started from an initial position of the skill button, obtaining a current position P2 of a touch point of the sliding operation, and calculating a vector a from an initial tapping position P1 of the touch point to the current position P2.

After tapping the skill button, the player identifies that a skill operation corresponding to the skill button needs to be released subsequently. After the skill button is tapped, when a finger slides the skill button, a system performs a real-time monitoring for the track of the sliding operation in real time, which obtains the current position of the touch point, and then calculates the vector a by the initial tapping position P1 as a start point and the current position P2 as an end point. When a corresponding control instruction is generated subsequently, the direction information of the vector indicates the skill release direction of the character. The position of the skill button may correspond to a position of an icon of the skill button on a touchscreen, or may correspond to a position of a region around the icon of the skill button on a touchscreen. In the region, although the touch point is not directly in contact with the icon of the skill button, a touching operation may still be identified as a trigger of tapping the skill button. Therefore, the position of the region is also considered as the position of the skill button.

In this step, preferably, as a feedback of the track of the sliding operation by the player, a visual reference identifier moving along the track of the sliding operation is provided, to feed back the track of the sliding operation to the player. Further preferably, the icon of the skill button can be directly controlled to move along the track of the sliding operation, so as to be used as a feedback to the player.

(S4) In response to release of the sliding operation of the player, or in response to meet the condition of |a|>L, where L is a preset threshold, generating a first operating instruction for controlling the game character to release the skill corresponding to the skill button, where a release direction of the skill is the same as a direction of the vector a; and unlocking the virtual joystick.

The player performs the sliding operation on the screen after tapping the skill button. Releasing the skill button after sliding operation is considered as being expected to release a skill after the operation is over, so as to generate the first operating instruction to control the game character to release the corresponding skill. The release direction is set according to the vector a that is from the initial tapping position P1 to the current position P2 in the sliding operation through the foregoing step. In addition to the trigger manner of releasing the sliding operation, triggering may also be performed according to the length of the vector a. That is, when the length of the vector a exceeds the preset threshold, it is considered that the player expects to release a skill after performing a sliding operation, and then generating the first operating instruction. In the first operating instruction, the direction information of the vector generated by the player by performing a sliding operation is considered as an indication for the skill release direction, and the game character is controlled to generate skill release in the corresponding direction. If the skill button is a dodge skill button, the game character is controlled to dodge in the direction of the vector a. If the skill button is a jump skill button, the game character is controlled to jump in the direction of the vector a. If the skill button is an attack skill button, the game character is controlled to attack in the direction of the vector a. Similarly, the other skill buttons required to be combined with a direction, whose skill release directions can be set according to the direction of the vector a. After the skill is released by means of controlling by using the first operating instruction, the virtual joystick is unlocked, so as to restore controlling of the virtual joystick over the game character. Then, the skill button and the virtual joystick are return to an initial state. The skill button may cooperate with the virtual joystick once again to implement the controlling of skill release, or the button may be controlled by a single hand to implement the controlling of skill release. If the button is controlled by the single hand, according to the foregoing method, as long as a finger of the player taps the skill button repeatedly and performs a sliding operation, when the finger releases or the sliding distance of the operation exceeds a preset threshold, the skill button in the game can be continuously triggered, and the skill release direction is changed with a sliding direction of a touch point of the finger.

Corresponding to the foregoing preferred setting, if the icon of the skill button is controlled to move along the track of the sliding operation in the step (S3), in the step (S4), after the game character is controlled to release the corresponding skill, the icon of the skill button is reset to an initial position. In this way, the button moves with sliding of the touch point of the player, and will be returned to the initial position after the sliding operation is finished, so as to achieve a better satisfy each operation habit of the player, facilitating operations of the player.

In the foregoing, the game character on a game interface of the mobile terminal generates a skill operation in a certain direction by triggering the skill button, implementing a sliding operation after the player taps the skill button by operating with a single hand. Therefore, the game character can be correspondingly controlled to release a corresponding skill in a direction of a vector of sliding. Operations are more efficient and institutive, and it is not necessary to cooperate very well by the left and right hands of player during the game, greatly reducing the operation complexity of the player. The operation and the release direction in the game are controlled by only one hand of the player, greatly preventing misoperation caused by the two hands cannot perform the operations synchronously.

Further preferably, in addition to controlling the skill release of the game character, it is further comprised controlling the movement of the game character. Specifically, in the step (S2), the virtual joystick is locked for disabling control of the skill release direction of the game character; control of the movement of the game character is further disabled. In the control instruction in the step (S4), before controlling the game character to release the corresponding skill, the game character is further controlled to move in the direction of the vector a. Specifically, if it is expected that the game character dodges in the direction of the vector a, it is usually expected that the game character moves by a distance to avoid attack from an opponent in the game. Therefore, according to the control instruction, the character is firstly controlled to move in the direction of the vector a, and then controlled to release the skill, which is better conformed to expectations of players by using a skill button, thereby improving operation interesting of the players. The foregoing movement in the direction of the vector a can be implemented by first controlling and adjusting an orientation of the game character and then controlling the game character to move forward. The movement in the direction of the vector a can also be implemented in another manner, and is not limited herein.

Second Embodiment

A difference between this embodiment and the first embodiment lies in that: During generation of a control instruction, different control instructions are generated according to synthetic judgment of a vector length and the release of the touching operation, so that a control process in the game is more precise, and the control instructions are separately corresponding to the different operations of a player.

Figure 3:
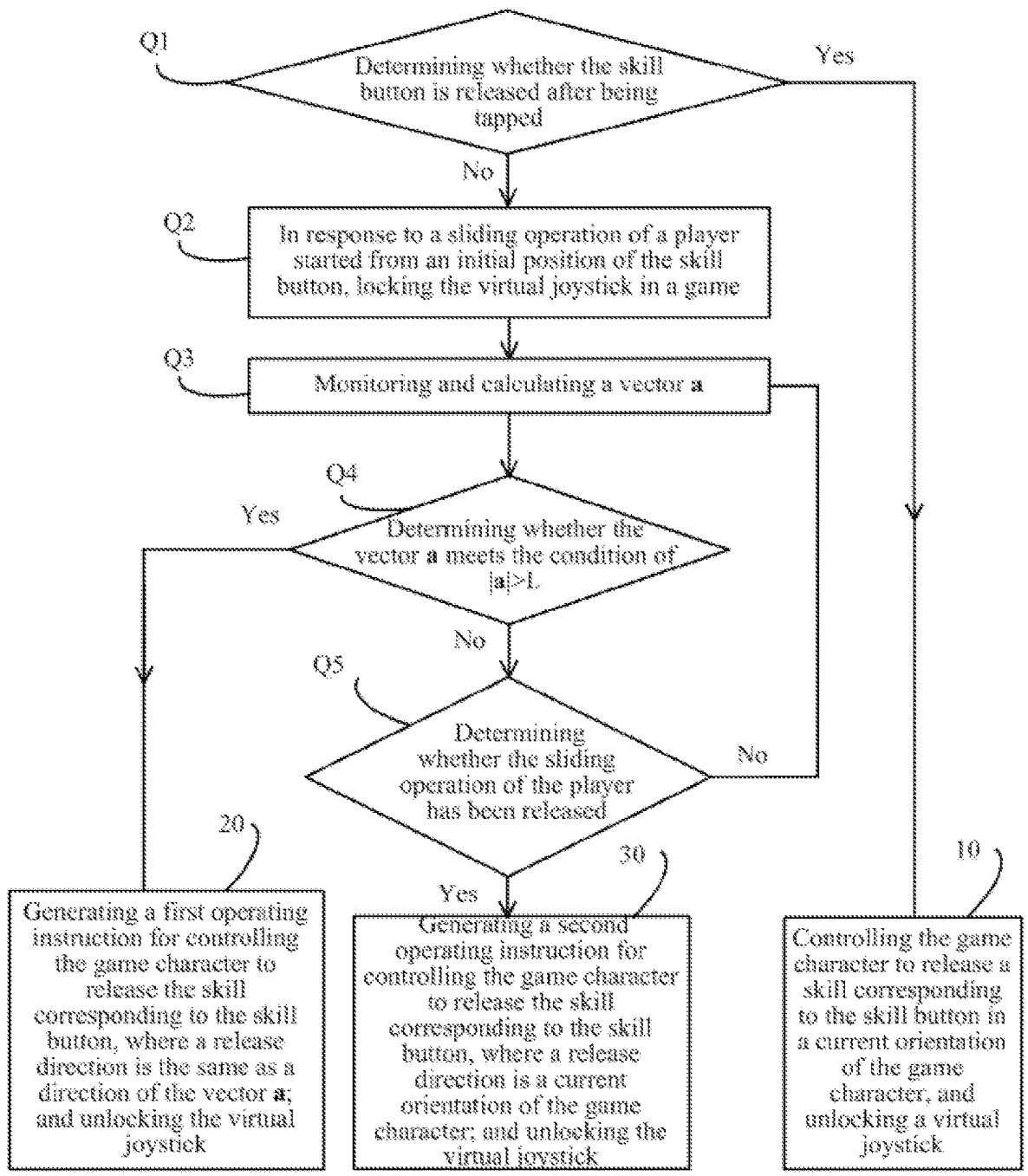
FIG. 3 is a flowchart of a method for controlling a game character according to a second embodiment of the present application.

As shown in FIG. 3, FIG. 3 shows a method for controlling a game character in this embodiment. A game character is a game character in a game on a mobile terminal. The mobile terminal may be a mobile phone, a handheld game console, or a tablet computer. According to the method, the game character is controlled via a virtual control component. The virtual control component comprises a skill button used for controlling skill release of the game character and a virtual joystick used for controlling movement and a skill release direction of the game character. The skill button is any one of skill buttons that require to be used in combination with direction control, for example, a dodging skill button, a jumping skill button, a moving skill button, or an attacking skill button. The control method comprises the following steps:

(Q1) Determining whether the skill button is released after being tapped; if yes, (10) controlling the game character to release a skill corresponding to the skill button in a current orientation of the game character, and unlocking the virtual joystick; if no, performing step (Q2).

(Q2) In response to a sliding operation of a player started from an initial position of the skill button, locking the virtual joystick in a game for disabling control of the skill release direction of the game character.

(Q3) Monitoring a track of the sliding operation of the player started from an initial position of the skill button, obtaining a current position P2 of a touch point of the sliding operation, and calculating a vector a from an initial tapping position P1 of the touch point to the current position P2 of the touch point.

Settings of the foregoing three steps are the same as those of the steps (S1), (S2), and (S3) in Embodiment 1. Details are not repeatedly described.

In the step (Q3), similarly, preferably, as a feedback of the track of the sliding operation by the player, a visual reference identifier moving along the track of the sliding operation is provided, to feed back the track of the sliding operation to the player. Further preferably, the icon of the skill button can be directly controlled to move along the track of the sliding operation, so as to be used as a feedback to the player.

(Q4) Determining whether the vector a meets the condition of $|a|>L$, where L is a preset threshold; if yes, (20) generating a first operating instruction for controlling the game character to release the skill corresponding to the skill button, where a release direction is the same as a direction of the vector a; and unlocking the virtual joystick; if no, performing step (Q5).

After the vector a is obtained in the step (Q3), comparing the length of the vector a with the preset threshold. If the length of the vector a is greater than the preset threshold, it may be considered that the game player intends to perform the sliding operation in a certain direction. Therefore, after direction information is identified, the direction information is converted into skill release direction of the game character. In this way, the skill corresponding to the skill button can be controlled to be released in the direction the same as that of the vector a, that is, in the sliding direction on the game interface. After skill releasing, the virtual joystick is unlocked. If the length of the sliding vector is less than the preset threshold, the operation may be an unintentional operation of direction, or may be an incomplete sliding operation, and therefore the operation should be identified in combination with determining in the next step.

(Q5) Determining whether the sliding operation of the player has been released; if yes, (30) generating a second operating instruction for controlling the game character to release the skill corresponding to the skill button, where a release direction is a current orientation of the game character; and unlocking the virtual joystick; if no, returning to step (Q3).

In this step, if it is determined that the finger of the player has loosened for sliding, the sliding operation has ended. It indicates that the relatively short sliding in the foregoing step is an unintentional operation of direction. Therefore, a control effect at this time is set to be an effect similar to that obtained when the skill button is tapped, that is, "controlling to release the skill corresponding to the skill button, where a release direction is a current orientation of the game character". The current orientation is obtained by means of control and adjustment before the virtual joystick is locked. Similarly, after skill releasing, the virtual joystick is unlocked.

In this step, if it is determined that the finger of the player has not loosened for sliding, that means the sliding operation is not over. It indicates that the relative short-distance sliding in the foregoing step is an unfinished sliding operation, and the step (Q3) is returned to perform distance detection and vector calculation, until comprehensive identification control over an action and a release direction is implemented after the sliding distance of the touch point exceeds the preset threshold.

Similarly, corresponding to the foregoing preferred setting, if the icon of the skill button is controlled to move along the track of the sliding operation in the step (Q3), in the step (Q4) and the step (Q5), after the game character is controlled to release the corresponding skill, the icon of the skill button will be returned to the initial position.

According to the method for controlling a game character in this embodiment, a game character on a game interface of the mobile terminal generates a skill operation in a particular direction by tapping the skill button. After the player taps the skill button, a finger performs a sliding operation in a direction, and the character in a game releases a skill corresponding to the skill button in a sliding direction. The left hand and the right hand do not need to cooperation as much as ever to complete an operation by controlling the virtual joystick and the skill button. According to the control method in this embodiment, the player can manipulate the game character by tapping the button and performing sliding operation with a single hand. The operation is simple and fast, greatly preventing misoperation caused when the two hands cannot perform operations synchronously, thereby effectively reducing a misoperation rate. In addition, in a control process, the game character releases the skill in the sliding direction of the finger. Accordingly, control is more efficient and intuitive, and then game interesting is further increased.

Similarly, preferably, in addition to controlling the skill release of the game character, it is further comprised controlling the movement of the game character. Specifically, in the step (Q2), the virtual joystick is locked for disabling control of the skill release direction of the game character; controlling of the virtual joystick over the movement of the game character is further disabled. In the first operating instruction in the step (Q4), before controlling the game character to release the corresponding skill, the game character is further controlled to move in the direction of the vector a. In the second operating instruction in the step (Q5), before controlling the game character to release the corresponding skill, the game character is further controlled to move in a direction along the orientation of the game character. In this way, before the game character is controlled to release the skill, the game character is usually expected to move. Therefore, according to the control instruction, the game character is firstly controlled to move in the direction of the vector a or in the direction along the orientation of the game character, which is better conformed to expectations of players by using a skill button, thereby improving operation interesting of the players. Similarly, the foregoing movement in the direction of the vector a can also be implemented by first controlling and adjusting an orientation of the game character and then controlling the game character to move forward. The movement in the direction of the vector a can also be implemented in another manner, and is not limited herein.

Although the present applications described above in further detail through specific preferred embodiments, the present application is not limited to the specific embodiments. It should be understood by persons of ordinary skill in the art that any simple deduction or replacement made without departing from the spirit of the present application shall fall within the protection scope of the present application.

What is claimed is:

1. A method for controlling a game character, used for controlling the game character by using a virtual control component, wherein the virtual control component comprises a virtual skill button used for controlling skill release of the game character and a virtual joystick used for controlling movement of the game character and controlling a skill release direction of the game character, and the method comprises the following steps:

(Q1) in response to a sliding operation of a player started from an initial position of the virtual skill button, locking the virtual joystick in a game for disabling control of the skill release direction of the game character;

(Q2) monitoring a track of the sliding operation of the player started from the initial position of the virtual skill button, obtaining a current position P2 of a touch point of the sliding operation, and calculating a vector a from an initial tapping position P1 of the touch point to the current position P2 of the touch point, wherein the initial tapping position P1 of the touch point is the initial position of the virtual skill button;

(Q3) determining whether the vector a meets the condition of $|a|>L$, wherein L is a preset threshold; if yes, generating a first operating instruction for controlling the game character to release a skill corresponding to the virtual skill button, wherein a release direction is the same as a direction of the vector a; and unlocking the virtual joystick; if no, performing step (Q4); and (Q4) determining whether the sliding operation of the player has been released; if yes, generating a second operating instruction for controlling the game character to release the skill corresponding to the virtual skill button, wherein a release direction is a current orientation of the game character; and unlocking the virtual joystick; if no, returning to step (Q2).

2. The method for controlling a game character according to claim 1, wherein in the step (Q1), when the virtual joystick is locked to disable control of the virtual joystick over the skill release direction of the game character, control of the virtual joystick over the movement of the game character is further disabled.

3. The method for controlling a game character according to claim 2, wherein the first operating instruction in the step (Q3) further comprises: before controlling the game character to release the corresponding skill, controlling the game character to move in the direction of the vector a; and the second operating instruction in the step (Q4) further comprises:

before controlling the game character to release the corresponding skill, controlling the game character to move forward to the direction of the game character.

4. The method for controlling a game character according to claim 1, wherein the step (Q2) further comprises: providing a visual reference identifier moving with the track of the sliding operation, to provide feedback of the track of the sliding operation to the player.

5. The method for controlling a game character according to claim 1, wherein the step (Q2) further comprises: controlling an icon of the virtual skill button to move along the track of the sliding operation, to feed back the track of the sliding operation to the player.

6. The method for controlling a game character according to claim 5, wherein in the step (Q3) and the step (Q4), after controlling the game character to release the corresponding skill, resetting the icon of the virtual skill button to the initial position.

7. The method for controlling a game character according to claim 1, wherein the virtual skill button is a dodge skill button, and controlling the release direction to be the same as the direction of the vector a in the step (Q3) refers to controlling the game character to dodge in the direction of the vector a; or the virtual skill button is a jump skill button, and controlling the release direction to be the same as the direction of the vector a in the step (Q3) refers to controlling the game character to jump in the direction of the vector a; or the virtual skill button is an attack skill button, and controlling the release direction to be the same as the direction of the vector a in the step (Q3) refers to controlling the game character to attack in the direction of the vector a.

8. The method for controlling a game character according to claim 1, before the step (Q1), further comprising a determining step: determining whether the virtual skill button is released after being tapped; if yes, controlling the game character to release the skill corresponding to the virtual skill button in a current orientation of the game character, and unlocking the virtual joystick; if no, performing the step (Q1).

9. The method for controlling a game character according to claim 1, wherein the game character is the game character presented in a game on a mobile terminal.

* * * * *